July 14, 1936.  W. A. LOOMIS  2,047,569
SAFETY TUBING GATE
Filed Feb. 24, 1930  3 Sheets-Sheet 2
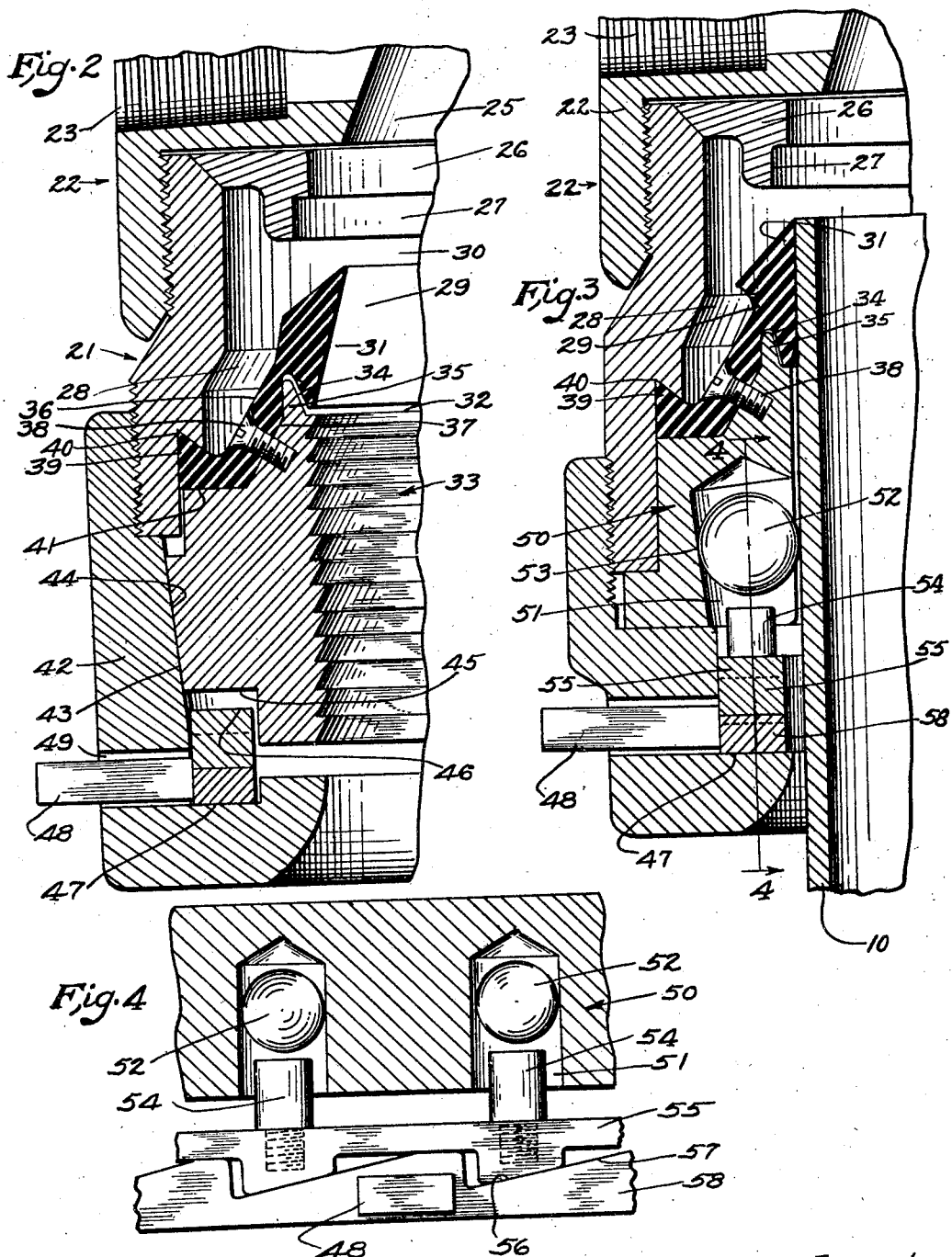
Inventor,
Walter A. Loomis.
By Townsend, Loftus, & Abbott.
Attorneys July 14, 1936.  W. A. LOOMIS  2,047,569
SAFETY TUBING GATE
Filed Feb. 24, 1930  3 Sheets-Sheet 3
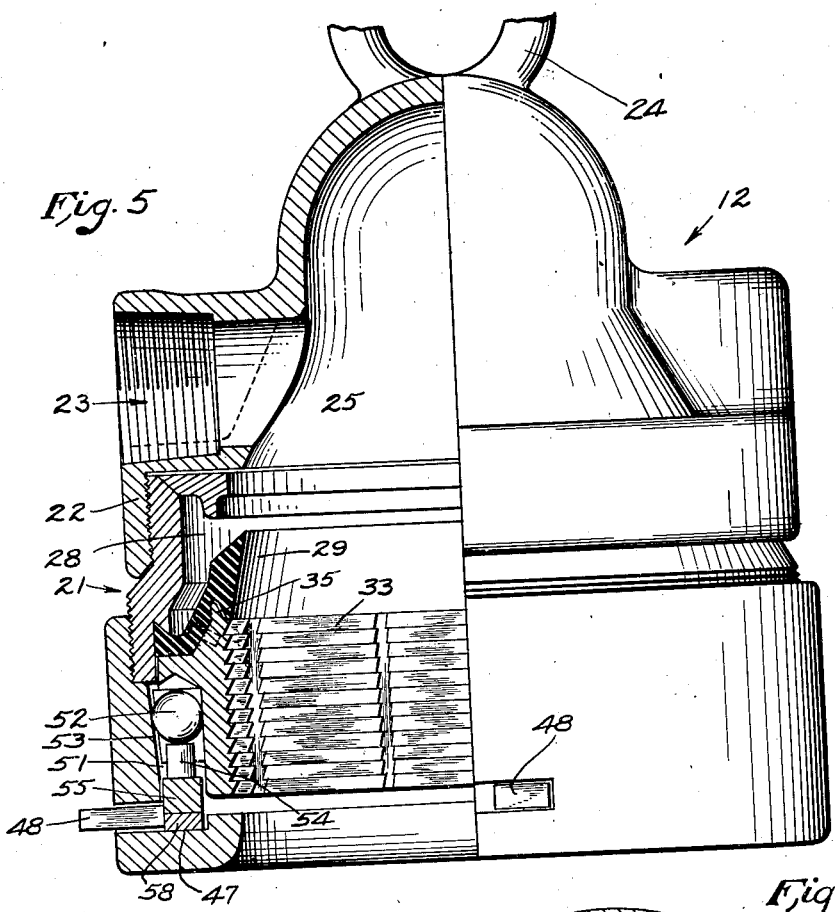
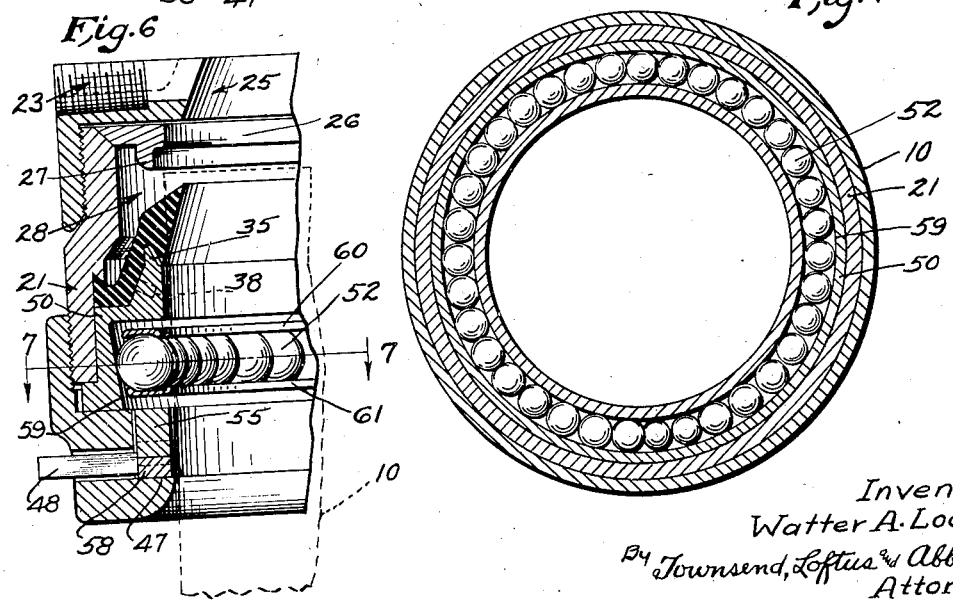
Inventor
Walter A. Loomis
By Townsend, Loftus & Abbett
Attorneys Patented July 14, 1936

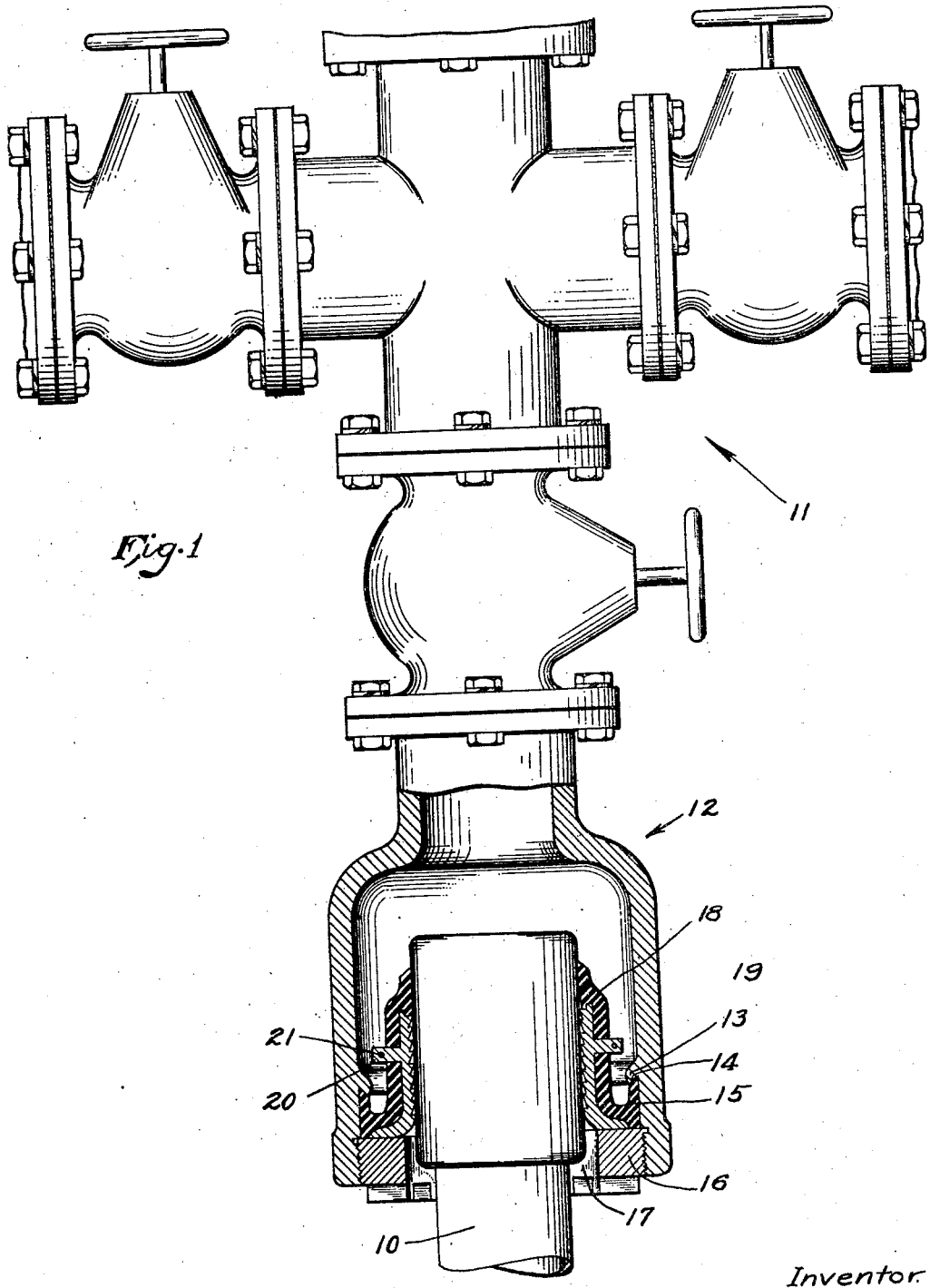

2,047,569

UNITED STATES PATENT OFFICE 2,047,569

SAFETY TUBING GATE

Walter A. Loomis, Long Beach, Calif.

Application February 24, 1930, Serial No. 430,512

12 Claims. (Cl. 285—161)

This invention relates to a safety tubing gate and is a continuation in part of my application entitled "Safety tubing gate", filed by me August 23, 1927, bearing Serial No. 214,869.

In oil well practice it is often necessary to effect rapid connection between a pipe and some other fitting, and it is the principal object of the present invention to provide a safety tubing gate which may be conveniently slipped over the end of a pipe, and which will act due to mechanical means enclosed therein, and other means responsive to pressure of a fluid around the pipe to instantly embrace the pipe, and provide a non-leaking joint between the connected members, as well as positive gripping means to secure the two members in their connected positions.

The present invention contemplates the provision of a bell within which a pressure responsive joint structure is mounted, and in connection with which structure clutch means are incorporated to positively engage the wall of the tube and to permit a tube to be elevated after said engagement, the structure being provided with quick releasing means so that the joint elements may be easily separated when desired.

The invention is illustrated by way of example in the accompanying drawings in which:

Figure 1 is a view in vertical section and elevation showing one form of the present invention, and one manner in which it may be applied to practice.

Fig. 2 is an enlarged fragmentary view in section showing another form of the invention and indicating the pressure sealing means and positive gripping jaws.

Fig. 3 is an enlarged fragmentary view showing the form of the invention disclosed in Fig. 1, with the exception that ball clutch elements are used to grip the wall of the tubing.

Fig. 4 is a fragmentary view in section as seen along the line 4—4 of Fig. 3 and particularly disclosing the manner in which the ball clutch elements are released from their gripping position.

Fig. 5 is an enlarged view in vertical section and elevation showing a structure embodying the use of corrugated gripping jaws and ball members for moving and releasing the same.

Fig. 6 is an enlarged fragmentary view in vertical section showing another form of the invention in which a ball race is provided, and in which the balls of said race act as clutch elements.

Fig. 7 is a view in transverse section through the structure shown in Fig. 6, indicating the complete ball race and the balls associated therewith.

Referring more particularly to the drawings, 10 indicates a length of well casing, upon the upper end of which it is desired to mount fittings 11. It is understood that this is an emergency operation and that it may take place at a time when a well is out of control, thus making it necessary to rapidly position a connecting structure with relation to the open end of the casing 10 and to form a suitable joint therewith, at the same time providing positive gripping means which will prevent separation of the connected elements due to the internal pressure or mechanical movement. The connecting structure comprises a bell 12 of considerably greater diameter than that of the portion of the casing over which it fits. Formed upon the inner wall of the bell is a rib 13 which is undercut at 14 to receive the beveled lip of a packing ring 15. This packing ring is preferably formed of resilient material, such as rubber, which has been treated to render it substantially impervious to the action of oil. The packing ring 15 is held in its position by a threaded fastening ring 16, which is mounted within the mouth of the bell and has a central opening 17 therethrough which is of a larger diameter than the casing section extending through it. The packing ring 15 is formed integral with a packing sleeve 18 which has an outside diameter less than the inside diameter of the bell 12, and a wall thickness sufficient to give it strength without impairing its pliability.

The upper end or mouth of the sleeve is intended to embrace and fit snugly around the outer face of the casing 10. The outer surface of the mouth portion of the sleeve is tapered so that pressure within the bell 12 will force that portion of the sleeve inwardly and hold it securely against the surface contour of the casing. It will thus be evident that in the event the structure is mounted over the end of a casing from which fluid under pressure is being emitted, the pressure of this fluid will act between the wall of the bell 12 and the wall of the sleeve 18 to force the sleeve 18 around and against the surface of the casing 10 for a considerable distance therealong, to thus create a tight packing joint between the sleeve 18 so as to prevent an appreciable leakage of fluid. When the fluid is relieved of its pressure the sleeve 18 will assume its normal enlarged condition to permit the jaws 19 to move to retracted and non-gripping positions.

In order to hold the bell in position upon the upper end of the casing 10 and also to make it possible to lift the casing 10 by the bell, if desired, gripping jaws are provided. In Fig. 1 of the drawings these jaws are indicated at 19 and are there shown as having a serrated innerface engaging the wall of the casing, the lower ends of the jaws flaring outwardly to rest upon the ring 16 and to make it possible for the individual jaws to swing inwardly against the casing as influenced by the pressure of the resilient sleeve surrounding them and the action of the jaw teeth as they are forced to bite into the wall of the casing, and have extending pins 20 through which a wire 21 is threaded to hold the set of gripping jaws 19 in position. It will be evident that the pressure of the fluid within the bell 12 will not only act radially tending to compress the sleeve 18 around the casing 10 and cause the gripping jaws 19 to be forced into engagement with the casing, but this fluid pressure will tend to move the bell 12 longitudinally of the casing and in a manner tending to lift it therefrom. This action will cause the gripping members 19 to impinge into the surface of the casing and to hold the bell in position with greater force than would be obtainable from lateral pressure only.

In the form of the invention shown in Fig. 2, the structure is slightly different from that previously described in that the bell constitutes a tube portion 21 externally threaded at its upper end to receive a dome 22, having threaded bores 23 therein, and as shown in Fig. 5, provided with a connection 24 at its upper end to facilitate in manipulating the structure. The dome structure 22 has a central opening 25 in alignment with the center of the bell structure and in alignment with the upper end of the casing to be gripped. A presser ring 26 is seated in the upper end of the bell 21 and held by the dome. This ring has a downwardly extending lip 27 of considerably less diameter than the inside diameter of the sleeve 21, thus forming an annular pressure chamber 28, which circumscribes a packing element 29. The packing element in fact forms the inner wall of said chamber, although an annular passageway 30 occurs between the upper lip of the packing element 29 and the lower edge of the lip 27. The packing element 29 is formed of resilient and deformable material such as rubber, and has an inwardly flaring inner wall 31 terminating above the shoulder 32 of a serrated gripping jaw 33. An annular groove 34 is formed around the packing element to receive lip 35 of the jaw 33. This groove positions the jaw relative to the packing element, and due to the fact that there is considerable space between the inner wall of the lip 35 and the inner wall of the groove, inward flexure of the upper end of the packing element is permitted without resistance. The body portion of the packing element flares outwardly, as indicated at 36, and seats upon a conical face 37 of the gripping jaw 33. It is held in its seated position by a screw 38.

The lower end of the packing element has an upwardly tapered lip 39 extending into a V-shaped groove 40 of the bell 21. It is held in this position as it seats upon the shoulder 41 of the gripping jaw 33. The gripping jaws are enclosed by a wedge ring 42, which is threaded upon the lower end of the bell 21, and has an inwardly and downwardly flaring face 43 against which inclined faces 44 of the gripping jaws 33 rest. It will thus be evident that as pressure is exerted to force the jaws in a downward direction and to lift the tubing gate with relation to the casing over the end of which it is mounted the contiguous faces 43 and 44 of the wedge ring and the gripping jaws, respectively, will cause the jaws to be forced inwardly to impinge against the wall of the casing and to positively engage the same. This gripping action will continue so long as the fluid pressure within the casing and the tubing head is sufficient to force the face 43 upwardly and hold it in wedging relation to the jaws 33.

In order to release the jaws 33 their lower edges are inclined as indicated at 45 to rest upon the inclined upper face of a ring 46. This ring rests upon a seat 47 in a plane at right angles to the longitudinal axis of the device. The ring is provided with an operating pin 48, which extends outwardly through a slot 49 in the side of the ring and permits arcuate movement of the operating pin to shift the ring and to lift the gripping jaws 33.

In the form of the invention shown in Fig. 3 of the drawings, the packing element 29 is shown as associated with a different form of gripping device 50. This device is provided with longitudinally extending cylindrical pockets 51 within each of which a clutch ball 52 is mounted. The rear wall 53 of each of the pockets is inclined inwardly toward its lower end, and is thus out of parallelism with the side wall of the casing 10. Lifting pins 54 extend upwardly into the pockets 51 and when moved upwardly will encounter the balls 52 and lift them so that they will move free of the casing 10 and their gripping action will thus be discontinued. The pins 54 are mounted upon a shifting ring 55, as more particularly shown in Fig. 4 of the drawings. This ring is formed with inclined cam faces 56, and rest upon inclined faces 57 of a lifting ring 58. The lifting ring 58 rests upon the shoulder 47 and may be rotated by the radial pin 48, which will cause the rings to shift with relation to each other, and will cause a vertical movement of the lifting pins.

In the use of balls 52 for performing a gripping action between the safety tubing gate structure and the casing upon which it is mounted, it is desirable to obtain the action of a maximum number of balls around the circumference of the casing. This is due to the fact that there is only a point contact between each ball and the casing as compared with the serrated faces of the gripping jaws 33 in which there are a plurality of lines of contact. In order to obtain a maximum number of point contacts with the ball clutch arrangement a structure has been provided as more particularly shown in Figs. 6 and 7 of the drawings, where it will be seen that the ring 50 is formed with an annular inclined wall 59 along which a series of gripping balls 52 are positioned and are held between ball cage members 60 and 61. This construction eliminates the machine work required to form the various pockets 51 as shown in Figs. 3 and 4, and also makes it possible to use a much larger number of balls for the clutch. The entire ball race may be lifted by a structure similar to that shown in Fig. 4 and the increased number of contacts obtained will be evident from an examination of Fig. 7 of the drawings.

In the form of the invention shown in Fig. 5, a combination of the ball clutch and the serrated jaw is shown. This structure insures that the device will have a maximum positive gripping action as afforded by the serrated faces of the clutch jaws and a rapid release movement as afforded by the movement of the several clutch balls 52.

In operation of the present invention, the packing member 18 or 29 may be assembled with the desired type of gripping jaws and disposed within a suitable bell structure. This bell may be associated with any desired pipe fitting as for example the assembly shown in Fig. 1 of the drawings, or other fitting which may be appropriately used in connection with various oil well operations. When the structure is so assembled, the open end of the casing 10 may be inserted within the mouth of the bell and forced to a point where the casing will be encircled by the yieldable sleeve such as that indicated at 18 in Fig. 1, or the packing member 29, shown in Figs. 2, 3, 5, and 6. When in this position, the fluid being discharged by the casing will fill the cavity surrounding the packing member and will force this packing member inwardly around and against the wall of the casing. It will be appreciated that this action will take place satisfactorily, even though the casing is not exactly round in section. During this action the pressure will also force the gripping jaws inwardly against the wall of the casing, as for example, the jaws 19 in Fig. 1, or the jaws 33 in Figs. 2 and 5 and will tend to lift the entire tubing gate with relation to the casing upon which it is mounted. Thus the pressure of the fluid will act to bring the serrated faces of the jaws into positive gripping contact with the tubing, so that the bell will not be forced off of the end of the casing, and so that the casing might be lifted with the bell if occasion arises.

In the operation of the form of device shown in Figs. 3 and 6, the fluid pressure within the dome 22 will seal the packing element 29 around the well casing and will then tend to move the tubing gate longitudinally. It will be evident that any attempted movement of the bell in a counter-direction from that required to position it over the casing will be prevented due to the fact that the locking balls 52 will thus be wedged against the side of the casing, as they are forced along the inclined faces 53 of the pockets 51, or the annular groove 59. The pressure of the fluid will thus seal the packing around the casing and force the gripping elements into positive engagement with the casing and hold them in these positions so long as pressure is applied.

In the form of the device shown in Fig. 5, the gripping jaws 33 will not only be moved against the wall of the casing by the pressure of the fluid in the chamber 28, but will also be positively forced inwardly by the balls 52, acting within the pockets 51, formed in the backs of the gripping jaws 33. When it is desired to loosen the gripping jaws and to disengage the structure from the casing, the lifting rings 46 and 55 may be rotated to lift the gripping jaws or balls, as the case may be, thus causing these members to move away from the surface of the casing.

It will thus be seen that by the structure here disclosed, self-acting means are provided for embracing a casing, and form a hydraulic seal therewith, and positive means are provided for locking the device to the casing and releasing the same therefrom.

While I have shown the preferred form of my invention as now known to me, it will be understood that various changes may be made in the combination, construction, and arrangement of parts by those skilled in the art, without departing from the spirit of the invention as claimed.

Having thus described my invention, what I claim and desire to secure by Letters Patent is:

1. In a self-tightening closure unit, suitable for external and terminal application to a projecting tube, a bell element having an open end to receive the projecting tube, tube-engaging gripping elements, and means functionally interposed between said bell and said gripping elements for so confining interior pressure as directly to apply said gripping elements to said tube, said means comprising a packing ring having portions engaging the tube, the bell element and the gripping elements.

2. In a self-tightening closure unit, suitable for external and terminal application to a projecting tube, a bell element, tube-engaging gripping elements, and means functionally interposed between said bell and said gripping elements for so confining interior pressure as directly to apply said gripping elements to said tube, said confining means comprising an intermediate element provided with an inwardly facing flange to engage said tube, and with an outwardly facing flange to engage said bell.

3. In a self-tightening closure unit, suitable for external and terminal application to a projecting tube, a bell element having an open end to receive the projecting tube, tube-engaging gripping elements, and means functionally interposed between said bell and said gripping elements, for so confining interior pressure as directly to apply said gripping elements to said tube, said means comprising a packing ring engaging the tube, the bell element and the gripping elements, the gripping elements being in the form of separate slips carried by said pressure-confining means.

4. In a self-tightening closure unit, suitable for external and terminal application to a projecting tube, a bell element having an open end to receive the projecting tube, tube engaging gripping elements, and means functionally interposed between said bell and said gripping elements, for so confining interior pressure as directly to apply said gripping elements to said tube, said means comprising a packing ring having portions engaging the tube, the bell element and the gripping elements, the gripping elements being in the form of separate slips carried by said pressure-confining means and retained by an annular element engaging an extension of said bell.

5. In a self-tightening closure unit, suitable for external and terminal application to a projecting tube, a bell element having an open end to receive the projecting tube, tube-engaging gripping elements, and means functionally interposed between said bell and said gripping elements for so confining interior pressure as directly to apply said gripping elements to said tube, said means comprising a packing ring having peripheral portions engaging the tube and the bell element and the intermediate portion engaging the gripping elements, the gripping elements being in the form of separate slips provided with serrated surfaces and with means for securing the same to said pressure-confining means to form a replaceable interior assembly, and means for removably securing said assembly within said bell.

6. In a self-tightening closure unit comprising a bell element having an outlet opening provided with means for the attachment of a control fitting thereto, said bell element also having an open end to receive a projecting tube, a filler comprising an elastic intermediate element and separately movable serrated slips, said filler forming a packing and having portions engaging the bell element, the projecting tube and the slips, and means for removably securing said filler within said bell.

7. A self-tightening closure unit comprising, a bell element having an outlet opening provided with means for the attachment of a control fitting thereto, said bell element also having an open end to receive a projecting tube, a filler comprising an elastic intermediate element and separately movable serrated slips, said filler forming a packing and having portions engaging the bell element, the projecting tube and the slips, and means for removably securing said filler within said bell, said bell being provided with means limiting the inward movement of said filler.

8. A self-tightening closure unit comprising a bell element having an outlet opening provided with means for the attachment of a control fitting thereto, a filler comprising an elastic intermediate element and separately movable serrated slips, and means for removably securing said filler within said bell, said intermediate element being provided with an outwardly facing flange to engage said bell, with an additional flange to engage a tubular element, and with means for the retention of said slips.

9. An attachment for releasably connecting a head or the like to a well pipe, comprising a body adapted to be placed over and around the upper end of a well pipe, pipe gripping elements mounted on the body and adapted to grip the outside of the pipe by virtue of vertical and radial movement of their pipe gripping faces relative thereto, means carried on said head for releasing said members from gripping engagement with the pipe, and means actuated by fluid pressure directed downwardly along the outside of the pipe, for moving said elements with the pipe, said means being adapted to be actuated by fluid pressure alone to prevent leakage of the fluid between said body and the pipe and to communicate substantially the entire pressure of the fluid to the gripping elements.

10. An attachment for releasably connecting a head or the like to a well pipe, comprising a body adapted to be placed over and around the upper end of a well pipe, pipe gripping elements mounted on the body and adapted to grip the outside of the pipe, and a fluid pressure actuated packing ring within said body and engaging the outside of the pipe, said packing ring being adapted to bring the said elements into gripping engagement with the pipe upon the application of fluid pressure to said ring, and the ring having inner and outer lip portions adapted to be forced by fluid pressure into engagement with the pipe and body respectively.

11. An attachment for releasably connecting a head or the like to a well pipe, comprising a body adapted to be placed over and around the upper end of a well pipe, pipe gripping elements mounted on the body and adapted to grip the outside of the pipe, means actuated by fluid pressure directed downwardly along the outside of the pipe for bringing said elements into gripping engagement with the pipe, and means on said head for releasing said elements from gripping engagement with the pipe.

12. An attachment for releasably connecting a head or the like to a well pipe, comprising a body adapted to be placed over and around the upper end of a well pipe, pipe gripping elements mounted on the body and adapted to grip the outside of the pipe, means operable by fluid pressure to bring said elements into gripping engagement with the pipe and a rotatable cam ring on said head for releasing said elements from gripping engagement with the pipe.

WALTER A. LOOMIS.